April 12, 1966  F. E. SCHEIDLER  3,245,324
HYDRAULIC COMPUTER
Filed May 25, 1964
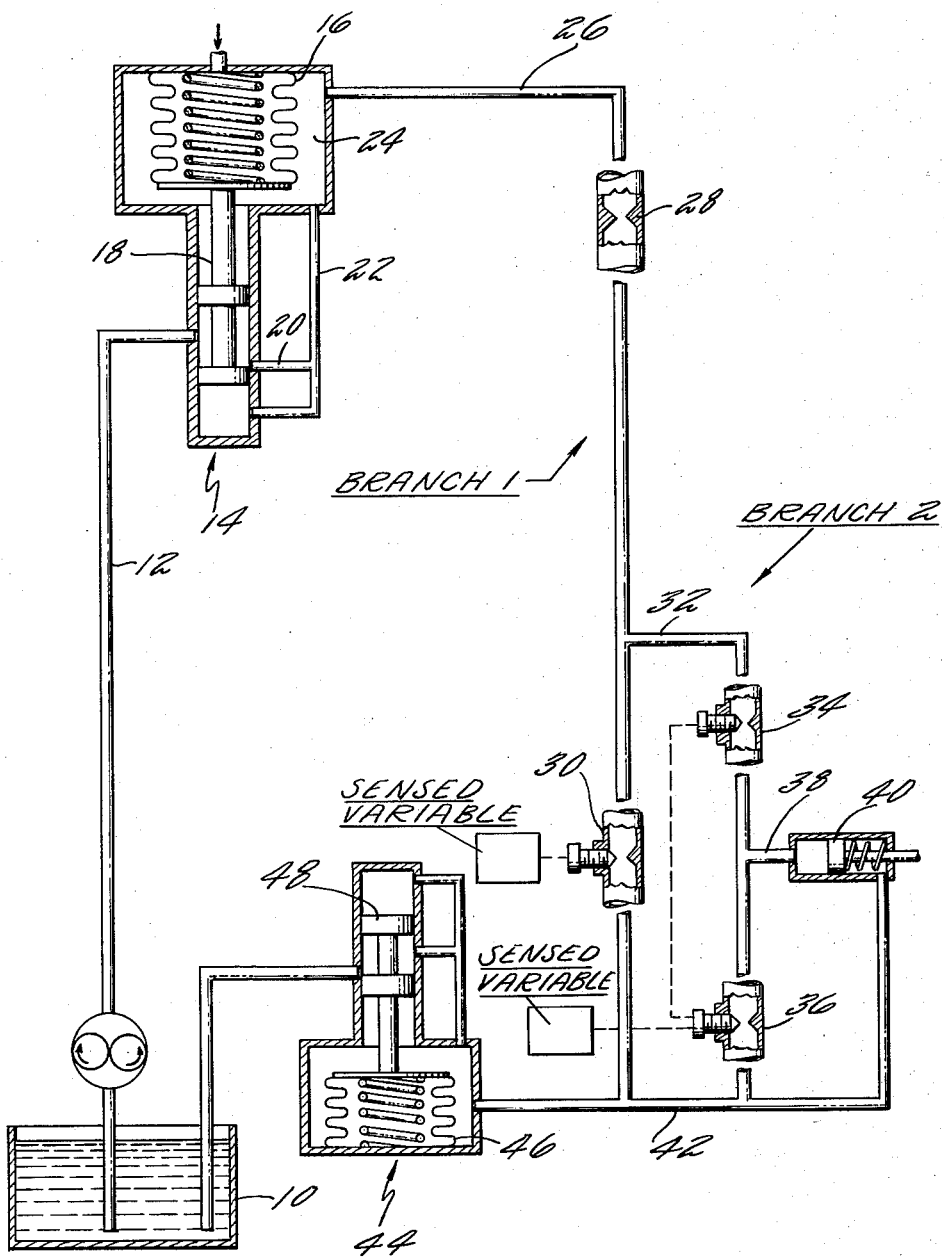
INVENTOR
FREDERICK E. SCHEIDLER
BY Norman Friedland
ATTORNEY

United States Patent Office 3,245,324
Patented Apr. 12, 1966

3,245,324
HYDRAULIC COMPUTER
Frederick E. Scheidler, West Hartford, Conn., assignor to United Aircraft Corporation, East Hartford, Conn., a corporation of Delaware
Filed May 25, 1964, Ser. No. 369,851
4 Claims. (Cl. 91—446)

This invention relates to hydraulic computing devices and particularly to a hydraulic system producing an output signal which is the product of a plurality of variables.

It is generally well-known in the art that hydraulic multiplication can be effectuated by bleeding fluid through suitably disposed restrictions. The area of some of these restrictions vary as a function of the variables whose product is desired for creating and controlling the pressure drop across a fixed restriction. An example of such a system may be had by referring to my U.S. patent application, Serial No. 318,671, filed October 24, 1963, and assigned to the same assignee. As is disclosed in this application, branch lines containing suitably mounted restrictions, serve to bleed fluid in the proper manner for computing sensed power plant operating variables for controlling fuel flow thereto. Generally, it is customary to mount one of the variable restrictions in series with a fixed restriction and locate a branch line intermediate the two restrictions. This arrangement effectuates multiplication of two variables. In order to obtain additional multiplication, another branch line having disposed therein a second set for restrictors is connected intermediate the two restrictions of the first branch line. The product in terms of a hydraulic pressure is created intermediate the restrictions of the second branch line. This pressure is then fed to an actuator for effecting control.

A problem arises with this type of fluid circuit inasmuch as when one of the variables changes the area of the variable restriction in the second branch, the pressure value computed by the restrictions in the first branch is affected resulting in an error. I have found that I can eliminate this error by making the normally fixed restrictor in the second branch a variable restrictor and ganging it to the other variable restrictor in the second branch in such a manner that the area of both restrictors changes whenever the area of the variable restrictor changes.

It, therefore, is an object of this invention mechanism for assuring that the pressure signal set up in a hydraulic computing circuit remains unchanged when the pressure in a cooperating circuit of the computing circuit is altered.

A still further object is to obtain a constant resistance of the downstream branch of the hydraulic circuit.

Other features and advantages will be apparent from the specification and claims and from the accompanying drawing which illustrate an embodiment of the invention.

The sole figure is a schematic representation of a hydraulic system incorporating this invention.

As noted above, the problem solved by this invention is elimination of the error resulting from the interaction and loading between the branch lines in the hydraulic circuit. To understand the significance of this problem consider the case where it is desirable to multiply the functions of several variables identified as follows:

$$f(\theta_1) \times f(\theta_2) \times f(\theta_3) \times f(\theta_N)$$

Referring now to the hydraulic multiplication system shown as a preferred embodiment but not intended to be limited thereto, fluid from reservoir 10 is pumped through pipe 12 to the first signal generator generally indicated by numeral 14. This signal generator generates a hydraulic pressure signal which is a function of the pressure within bellows 16. The pressure in bellows 16 which is a variable, positions the free end of the bellows to, in turn, position pressure regulating valve 18. Pressure regulating valve 18, in turn, meters hydraulic pressure into lines 20 and 22, to cavity 24 where it surrounds the bellows. A portion of this fluid is fed to the underneath side of pressure regulating valve so that the forces acting on the pressure regulating valve and externally of the bellows matches the forces acting internally of the bellows in order to produce a hydraulic pressure signal in line 26 which is a function of the pressure internally of bellows 16. This pressure is then fed to the first branch of the hydraulic computing system where it is fed through fixed restriction 28 and then to a variable restriction 30. Branch line 32 connects to line 26 intermediate fixed restriction 28 and variable restriction 30. This branch line contains restriction 34 and variable restriction 36 which constitute the second branch of the multiplication system. The branch line 38 leads hydraulic fluid into servo piston 40 which translates as a function of the pressure acting on the underneath side thereof. Hence, as will be appreciated from the description to follow, a position of the servo piston is an indication of the product of the variables being multiplied as a consequence of the hydraulic system. It is noted that lines 26 and 32 communicate with drain line 42 for eventually returning the fluid back to the reservoir 10 via the pressure drain regulator 44. The pressure regulator may contain an absolute bellows 46 which carries on its free end pressure regulating valve 48 which serves to regulate the pressure in the drain line at an absolute value which may be considered the referenced pressure of the hydraulic multiplication system.

Next, considering the operation of this circuit in order to effectuate multiplication. In the discussion to follow, the capital letters A and P refer to area and pressure, respectively, and the subscript numerals refer to the particular location where the pressure value or area value is referenced. Now assuming that $P_{26}-P_{42}$ is a function of $\theta_1$:

$$A_{30}=f(\theta_2)$$
$$A_{34}=f_1(\theta_3)$$
$$A_{36}=f_2(\theta_3)$$
$$P_{38}-P_{42}=\text{the product of } \theta_1, \theta_2, \text{ and } \theta_3$$

It is generally well-known that when two orifices are mounted in series with no flow out of the branch line intermediate the two orifices the following relationship can be made:

$$P_{32}-P_{42}=\left[\frac{1}{1+\left(\frac{A_{30}}{A_{28}}\right)^2}\right](P26-P_{42})$$

For a fuller understanding of this equation reference is hereby made to my application 318,671 supra. Hence, by setting $P_{26}-P_{42}$ equal to a function of one variable and $$\frac{1}{1+\left(\frac{A_{30}}{A_{28}}\right)^2}$$

equal to a function of a second independent variable, $P_{32}-P_{42}$ is, therefore, equal to a function of the product of the two variables. Pressure signal in line 32 can be further multiplied by a third independent variable by inserting a second branch line to perform the same function as described in connection with the first branch line. Thus, all that would be necessary to effectuate further multiplication is to dispose a fixed restriction in series with a variable restriction and account for the average effect of the second branch on the flow through the first branch by properly adjusting the areas of the orifices in the first branch to obtain the same relationship as was obtained in the branch line 1. However, a problem occurred inasmuch as when the variable restriction 36 of branch 2 changed, it ultimately affected the pressure drop across fixed restriction 28. Since this pressure drop should solely be controlled by varying the area of restriction 30, the pressure change would be evidenced in line 32 without changing variable restriction 30. This, in essence, would produce an erroneous signal in line 32; so that it can be seen that due to the loading and interaction from the second branch an error would be created in the first branch. This error can be eliminated by making the fixed area restriction mentioned above into variable area restriction identified by numeral 34 and connecting it to variable restriction 36 in a suitable manner so that whenever variable restriction 36 is moved to the closed position, variable restriction 34 is moved to the open position and vice versa. In other words, it is necessary to hold the resistance in branch 2 at a constant so that the resistance from $P_{32}$ to $P_{42}$ is at a constant value. This can be accomplished by satisfying the following requirements:

(1) $$\left[\left(\frac{1}{A_{34}}\right)^2+\left(\frac{1}{A_{36}}\right)^2\right]=\text{constant}$$

(2) $$\left(\frac{A_{36}}{A_{34}}\right)=\text{to a function of } \theta_3$$

such that $$\frac{1}{1+\left(\frac{A_{36}}{A_{34}}\right)^2}=\text{a desired function of } \theta_3$$

It is therefore apparent from the above that the multiplication is accomplished between $P_{32}-P_{42}=f(\theta_1)\times f(\theta_2)$ and $f(\theta_3)$ so that $P_{38}-P_{42}=f(\theta_1)\times f(\theta_2)\times f(\theta_3)$.

Since the resistance of branch 2 is a constant, loadings or interaction errors are eliminated.

Obviously, in utilizing the hydraulic circuit the mechanism for varying the various variable orifices described in the circuit may take any form as for example the mechanism disclosed in my patent application, Ser. No. 318,671 supra.

It should be understood that the invention is not limited to the particular embodiments shown and described herein, but that various changes and modifications may be made without departing from the spirit or scope of this novel concept as defined by the following claims.

I claim:

1. A hydraulic computing system having at least two parallelly disposed flow lines communicating with a regulated pressurized drain, a variable and fixed restriction serially disposed in one of said flow lines, the area of said variable restriction varying as a function of a sensed variable, the other flow line communicating with the companion flow line at a point intermediate the fixed and variable restriction, said other flow line having a pair of variable restrictions serially disposed therein, the area of one of said variable restrictions varying as a function of a sensed variable, and the area of the other of said variable restrictions varying as a function of the first variable restriction so that when one restriction opens the other closes and vice versa, and means responsive to the pressure intermediate the last mentioned variable restrictions for producing an output signal commensurate with the product of the sensed variables.

2. In a hydraulic system for computing the product of a plurality of sensed variables, a source of fluid under pressure and a regulated pressurized drain, means for regulating the drain at a constant value, a fixed and first variable restriction disposed in serial relationship, a conduit leading fluid from said source through said first fixed restriction, said first variable restriction and then drain, means responsive to a variable for adjusting the area of said first variable restriction, a second variable restriction and a third variable restriction disposed in serial relation, a passage leading fluid from a point intermediate said fixed restriction and said first variable restriction through said second variable restriction, said third variable restriction and then drain, means responsive to another variable for adjusting the area for said third variable restriction, and means for interconnecting said third and second variable restrictions so that the area of said second variable restriction changes when the third variable restriction changes.

3. In a hydraulic system as defined in claim 2 wherein said regulating means serves to create a zero datum drain pressure value.

4. In a hydraulic system as defined in claim 2 wherein said fixed restriction is located upstream of said first variable restriction.

References Cited by the Examiner
UNITED STATES PATENTS
3,164,065  1/1965  Frantz _____ 91—449 X SAMUEL LEVINE, *Primary Examiner.*

P. T. COBRIN, *Assistant Examiner.*